(12) United States Patent
Zauder et al.

(10) Patent No.: US 8,814,210 B2
(45) Date of Patent: Aug. 26, 2014

(54) BELT PRESENTER AND SEAT BELT SYSTEM

(71) Applicant: TRW Automotive GmbH, Alfdorf (DE)

(72) Inventors: Mario Zauder, Winterbach (DE); Peter Goehringer, Bartholomae (DE); Markus Kees, Durlangen (DE); Juergen Petzi, Geislingen-Eybach (DE)

(73) Assignee: TRW Automotive GmbH, Alfdorf (DE)

( * ) Notice: Subject to any disclaimer, the term of this patent is extended or adjusted under 35 U.S.C. 154(b) by 0 days.

(21) Appl. No.: 13/628,184

(22) Filed: Sep. 27, 2012

(65) Prior Publication Data
US 2013/0088002 A1 Apr. 11, 2013

(30) Foreign Application Priority Data

Oct. 7, 2011 (DE) .................... 10 2011 115 107

(51) Int. Cl.
B60R 22/03 (2006.01)
B60R 22/20 (2006.01)
B60R 22/24 (2006.01)
B60R 22/02 (2006.01)

(52) U.S. Cl.
CPC ............. *B60R 22/03* (2013.01); *B60R 22/20* (2013.01); *B60R 22/24* (2013.01); *B60R 2022/021* (2013.01)

USPC ........ 280/801.2; 280/808; 280/807; 297/481; 297/483

(58) Field of Classification Search
CPC ........ B60R 22/03; B60R 22/24; B60R 22/20; B60R 22/18; B60R 2022/18; B60R 2022/021; B60R 2022/20
USPC .................. 280/801.2, 808, 804, 807, 801.1; 297/481, 483, 486
See application file for complete search history.

(56) References Cited

FOREIGN PATENT DOCUMENTS

| DE | 2541647 A1 | * | 3/1977 | ............. A62B 35/00 |
| DE | 2601171 A1 | * | 7/1977 | ............. A62B 35/00 |
| JP | 03000550 A | * | 1/1991 | ............. B60R 22/24 |

* cited by examiner

*Primary Examiner* — Keith Frisby
(74) *Attorney, Agent, or Firm* — Tarolli, Sundheim, Covell & Tummino LLP

(57) ABSTRACT

A belt presenter for a seat belt system comprising a belt strap and deflection fittings (16) includes an arm (102) having a belt strap guide (104) and a mounting portion (106) by which the arm (102) is adapted to be mounted to a vehicle lining (10). The arm (102) is manually movable about an axis of rotation (108) into a plurality of locking positions. The axis of rotation (109) about which the arm (102) can be rotated is arranged, in the vehicle-mounted state, to be offset from a mounting point (18) of deflection fittings (16) of the seat belt system.

13 Claims, 6 Drawing Sheets

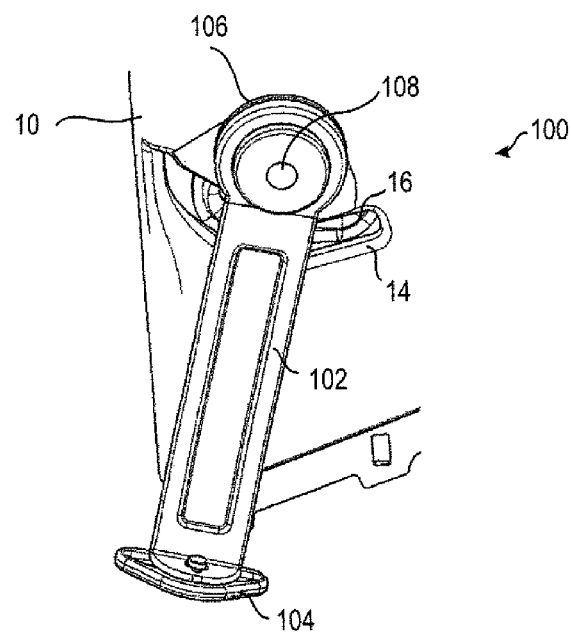
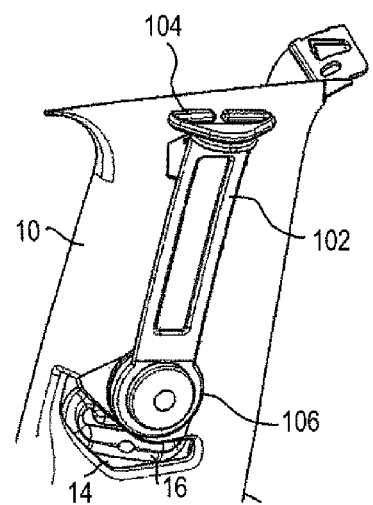
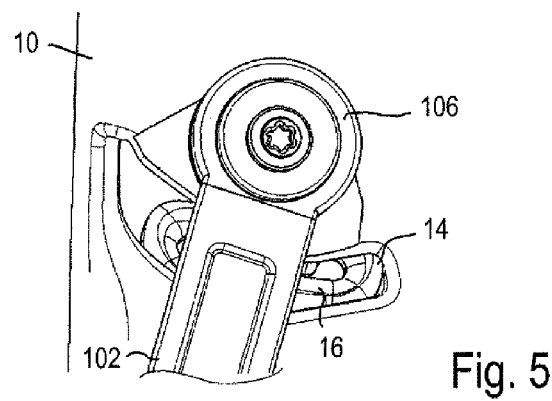

BELT PRESENTER AND SEAT BELT SYSTEM

FIELD OF THE INVENTION

The invention relates to a belt presenter for a seat belt system comprising a belt strap and deflection fittings.

BACKGROUND OF THE INVENTION

Belt presenters serve for bringing the belt strap of a seat belt during fastening for a vehicle occupant into a provided position that is different from the actual idle position of the belt strap predetermined by the anchoring points. For this purpose, a portion of the belt strap is brought in a position that is easy to reach for the vehicle occupant. There are very convenient solutions in which an arm of the belt presenter is moved by a motor as soon as the vehicle occupant has got into the vehicle, the arm returning to a parking position after fastening the seat belt. However, those belt presenters have a complex structure, require dedicated motors and a power supply and accordingly are expensive.

It is the object of the invention to provide a simple and inexpensive belt presenter.

SUMMARY OF THE INVENTION

In accordance with the invention, this object is achieved with a belt presenter for a seat belt system comprising a belt strap and deflection fittings in which an arm having a belt strap guide and a mounting portion is provided by which the arm is adapted to be mounted to a vehicle lining, the arm being manually movable about an axis of rotation into a plurality of locking positions. The belt presenter includes no independent motor drive but is configured to be manually brought into the desired position in which it remains until it is moved again by hand.

This is mainly advantageous when a vehicle is frequently used by the same person, because in this case the position in which the belt can be reached most conveniently does not change. If, however, for example in a three-door car the seat has to be moved to permit the occupant to get onto the rear seat, the belt presenter can simply be twisted to a position in which it does not interfere with getting in.

The arm is preferably rotatable about 360° in the mounted condition so that it can be conveniently moved to the desired position.

Advantageously a locking mechanism is provided for holding the arm in the locking positions. Locking positions can be provided at particular angular positions predetermined at will, for instance spaced at 5°, which allows sufficiently fine adjustment.

The locking mechanism preferably includes two interacting blocking structures biased against each other, wherein biasing is especially performed by means of a spring. It is ensured in this way that the arm is locked unless it is moved by hand. The spring force is advantageously dimensioned so that it can be overcome by manual force, but is chosen to be so high that the arm is retained in the desired position without any foreign application of force. The spring is thus preferably stronger than gravity and than the force caused by the usual vehicle motion and the inertia of the belt presenter which would cause automatic adjustment.

The spring action can be attained by providing a separate spring element, for instance, or by configuring one or both of the blocking structures and/or the components supporting the blocking structures to be elastically deformable.

The blocking structures can be formed e.g. by two meshing gearings. The gearings can have a radial or axial configuration. Flexible radially projecting lamellas or else one or more spring-loaded radially movable pins can also be used as blocking structure. It is also possible to generally use high-friction surfaces that are pressed against each other as blocking structures.

In a preferred embodiment the blocking structures are formed at nested bearing members, wherein in this case above all gearings are of advantage.

One of the blocking structures can be connected to rotate with the arm, while the other blocking structure is fixed arranged at the vehicle.

It is possible to form both blocking structures to cover 360°, but one or both of the blocking structures can just as well comprise only a smaller angular range, especially an angular range of about 5° to 130°.

In a preferred embodiment one of the blocking structures is disposed on the radial inside of a bearing member configured as bearing eye of the mounting portion of the arm and the second blocking structure is disposed outwards of a bearing member located radially inside the bearing eye. In these variants the blocking structures are arranged to be radially offset, preferably coaxially, with respect to each other.

In another preferred embodiment one of the blocking structures is formed on a rear side of the mounting portion of the arm, while the second blocking structure is provided at a bearing member facing the rear side of the arm. In these variants the blocking structures are arranged to be radially offset from each other with respect to the axis of rotation of the arm.

The invention moreover relates to a seat belt system comprising a belt presenter, for example as described above, wherein the axis of rotation about which the arm can be rotated is arranged to be offset from a mounting point of deflection fittings of the seat belt system in the vehicle-mounted state. This has the advantage that in a simple manner a more convenient belt presenting position can be reached than when the arm of the belt presenter is arranged, as is known, at the mounting point of the deflection fittings.

The belt presenter can be fastened exclusively to the vehicle lining. It need not absorb high forces so that it need not be fastened to a supporting member.

In the seat belt system preferably a lining member to be assembled on the vehicle side may be provided to which the belt presenter is fastened.

Subsequent assembly of the belt presenter in the vehicle is possible. For instance, to this end a lining member in the area of the deflection fittings can be exchanged for the just mentioned lining member including a belt presenter fastened thereto. Alternatively, the belt presenter can simply be attached to the lining member at a position in which the optimum presenting position of the seat belt can be adjusted for the vehicle occupant.

BRIEF DESCRIPTION OF THE DRAWINGS

FIGS. 3-5 show the seat belt system of FIG. 1 with the arm assuming different locking positions;

DESCRIPTION OF THE EXAMPLE EMBODIMENTS

Figure 1:
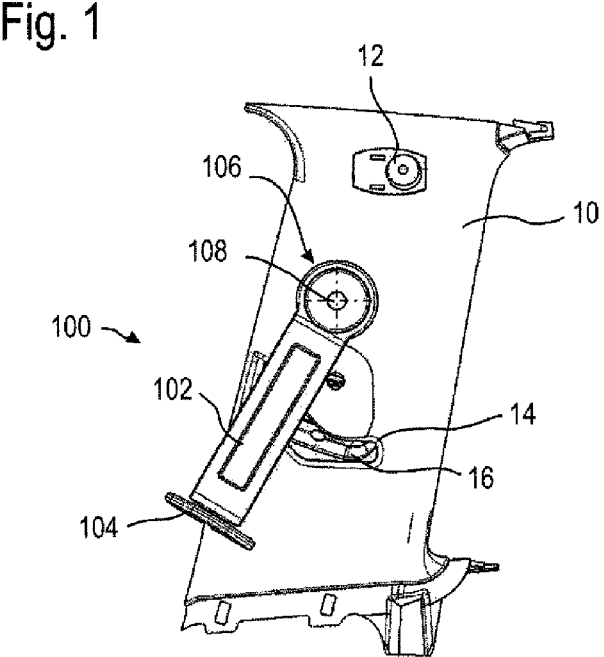
FIG. 1 shows a schematic view of a seat belt system according to the invention comprising a belt presenter according to the invention in the vehicle-mounted condition.

FIG. 1 illustrates a vehicle seat belt system comprising a lining member 10, for example in an upper portion of a B column of a car. To the lining member 10 a belt presenter 100 is fastened that includes an arm 102 having at one end a belt strap guide 104 in the form of an eye and at the other end a mounting portion 106. The belt strap guide 104 includes a slit so that the belt strap of the seat belt system can be threaded through the same (not shown here).

The arm 102 is mounted on the lining member 10 via the fastening portion 106. The arm 102 is adapted to be twisted about an axis of rotation 108, namely about full 360° in this example.

The belt presenter 100 can be mounted either subsequently to the lining member 10 or the lining member 10 can be configured so that the belt presenter 100 is mounted on the same already before and the lining member 10 is inserted in the vehicle together with the belt presenter 100. For this purpose, the lining member 10 includes mounting elements 12 by which it can be clipped, for instance, into the remaining lining or into the car body.

Figure 2:
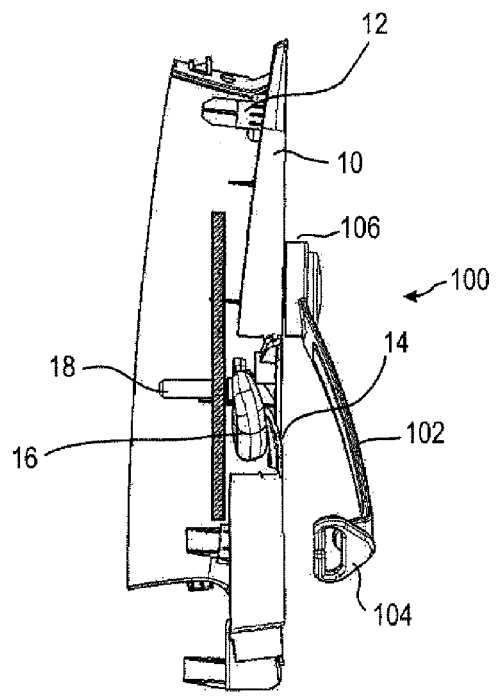
FIG. 2 shows a schematic lateral partially cut view of the seat belt system of FIG. 1.

In the lining member 10 moreover a slit 14 is provided behind which deflection fittings 16 of the seat belt system are mounted on the vehicle body via a mounting point 18. This is shown in FIG. 2. Through the slit 14 the belt strap not shown here emerges from behind the lining member 10.

The arm 102 of the belt presenter 100 can be manually adjusted into plural locking positions. In the present example, 72 locking positions are provided which are distributed over the entire circumference being offset by 5° each time.

The axis of rotation 108 of the arm 102 of the belt presenter 100 and the mounting point 18 of the deflection fittings 16 are offset against each other. In the example shown here an offset is provided at a height, but also any other distance would be possible. In any case the fastening portion 106 is not arranged at the mounting point 18 of the deflection fittings 16.

As can be inferred from FIG. 2, the fastening portion 106 is mounted only to the lining member 10 but not to body parts located there behind.

FIGS. 3 to 5 show different pivoting positions of the arm 102.

A locking mechanism ensures that the arm 102 automatically rests at the predetermined locking positions. The locking mechanism is configured so that it can be overcome and adjusted by manual force but locks vis-à-vis gravity and the usual vehicle motions.

Figure 6:
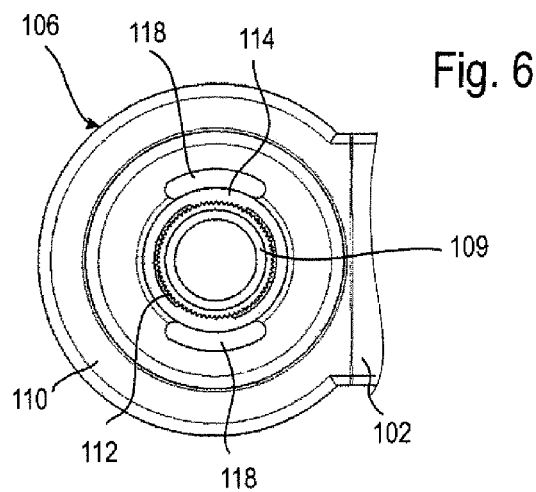
FIGS. 6-8 show a locking mechanism for a belt presenter according to the invention in accordance with a first embodiment.
Figure 7:
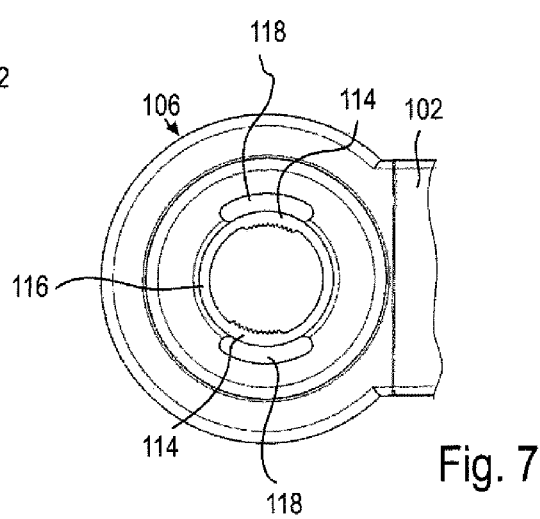
Figure 8:
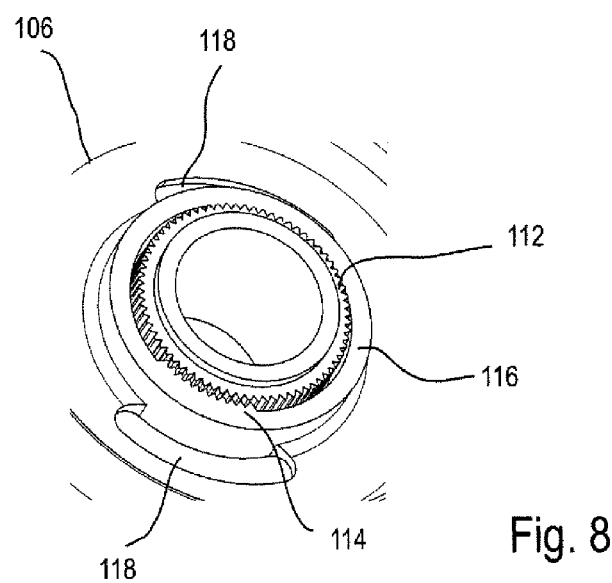
Figure 9:
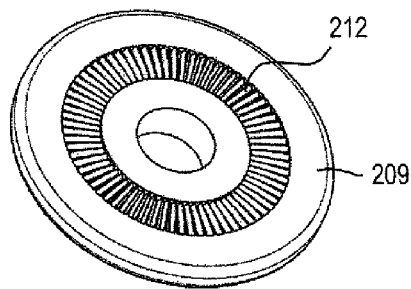
FIGS. 9-12 show a locking mechanism for a belt presenter according to the invention in accordance with a second embodiment.

The FIGS. 6 to 8 illustrate a first embodiment of the locking mechanism having two nested bearing members 109, 110, i.e. a bearing member fixed to the vehicle in the assembled state and a bearing eye formed at the arm 102. Each of the bearing members 109, 110 supports a blocking structure 112, 114. Both blocking structures 112, 114 are in the form of gearings in this case, the first blocking structure 112 being formed at the radial outside or the outer circumference of the bearing portion and the second blocking structure 114 being formed at the radial inside, i.e. the inner circumference of the bearing eye.

The gearing of the first blocking structure 112 is formed circumferentially about 360°, whereas the second blocking structure 114 has only few gears extending along the circumference only over an angular area of approx. 60°. However, there are provided two second blocking structures 114 which are arranged to be diametrally opposed. But also a different number of second blocking structures 114 could be used.

The second blocking structures 114 are formed at a separate elastically deformable ring 116 constituting the innermost area of the bearing member 110. In the area of the blocking structures 114 a respective free space 118 is provided radially directly connecting in the bearing member 110, through which free space the bridge confining the free space on the inside is resilient together with the blocking structures 114.

This arrangement ensures that the arm 102 can be twisted against the fixed bearing member 109. When the blocking force of the locking mechanism is overcome, the ring 116 including the second blocking structures 114 is radially outwardly deformed so that the gearings can slide over each other. If the force acting on the arm 102 subsides below the predetermined blocking force, the gearings of the blocking structures 114, 112 mesh and lock the arm 102 at one of the predetermined locking positions. Due to the gearing, a discrete number of locking positions corresponding to the number of gears is preset.

The arm 102, the bearing member 110, the ring 116 and the second blocking structures 114 are connected to rotate with each other.

FIGS. 9 to 12 illustrate a second embodiment of the locking mechanism. In the belt presenter 200 shown here a bearing member 209 fixed to the vehicle is opposed to a bearing member 210 provided at the mounting portion 206 of the arm 102. At both bearing members 109, 110 each of a first and second blocking structure 212, 214 is provided. The first blocking structure 212 is an end face of the bearing member 209 facing the fastening portion 206 in the form of a spur gearing extending over the entire circumference. The second blocking structure 214 is formed at an end face of the bearing member 209 facing the bearing member 209, equally in the form of a spur gearing which only extends over approx. 30°, however. In this case only one second blocking structure 214 is provided, but there could as well be provided two or more second blocking structures 214 distributed over the circumference as in the first example.

Figure 10:
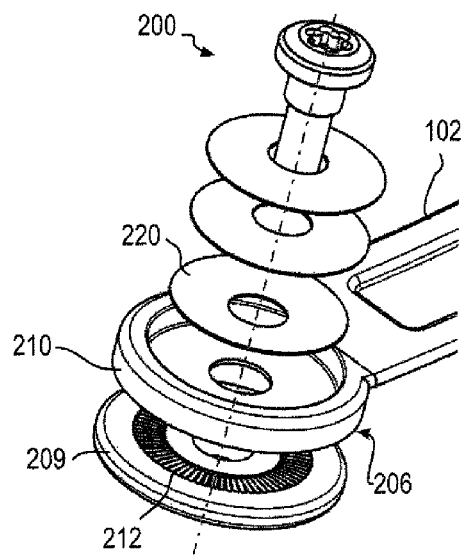
Figure 11:
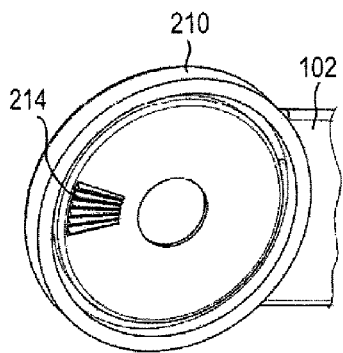

The necessary biasing force pressing the blocking structures 212, 214 against each other is attained in this case by a disk spring 220 acting on both bearing members 209, 210. This is shown in FIG. 10 in an exploded view.

Figure 12:
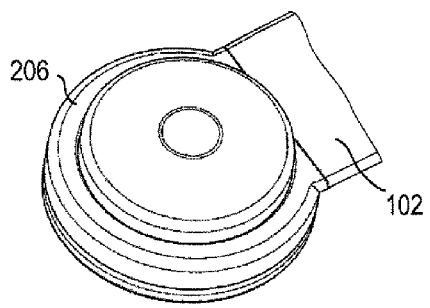
Figure 13:
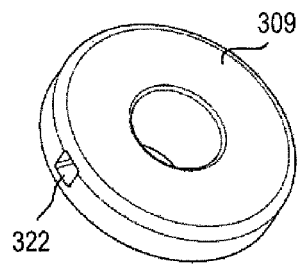
FIGS. 13-16 show a locking mechanism for a belt presenter according to the invention in accordance with a third embodiment.

FIG. 12 shows the fastening portion 206 of the belt presenter 200 in the fully assembled state.

In the FIGS. 13 to 16 a third embodiment of the locking mechanism is shown.

In this case, the first blocking structure 312 is formed at the outer circumference of a radially inner bearing member 309, namely in the form of one or more spring-loaded radially biased gears.

Figure 14:
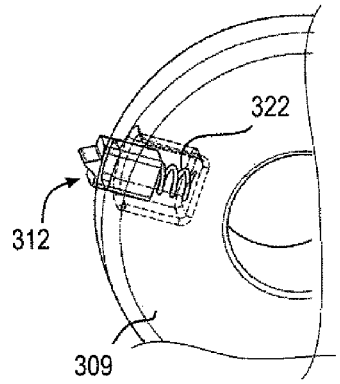
Figure 15:
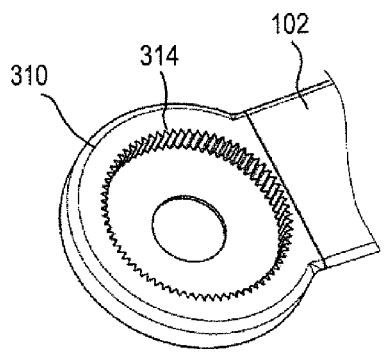

Each of the gear and the spring 320 are inserted in a recess 322 in the bearing member 309, as is evident from FIG. 14. Here only one gear is provided, but of course also plural gears can be distributed over the circumference in the form of first blocking structures 312.

Figure 16:
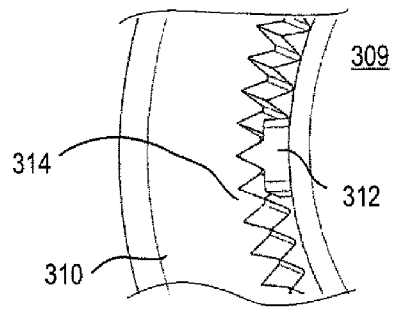

The second blocking structure 314 is configured in the bearing member 310 in the form of a bearing eye at the end of the arm 102 in the form of a circumferential gearing at the radially inner circumferential wall of the bearing member 310. Meshing of the blocking structures 312, 314 is shown in FIG. 16.

The spring 320 forcing the gear of the blocking structure 312 radially outwardly is dimensioned as to its spring force such that manual twisting of the arm 102 vis-à-vis the bearing member 309 is possible.

The flanks of the gearings of the gear of the first blocking structure 312 and of the gearing of the second blocking structure 14 are configured so that the gear is pushed into the recess 322 by a manually applied force of rotation.

Figure 17:
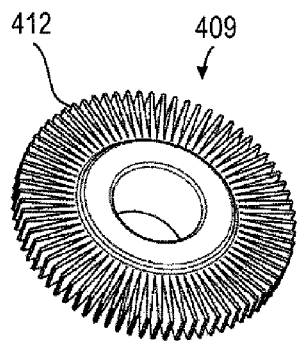
FIGS. 17-19 show a locking mechanism for a belt presenter according to the invention in accordance with a fourth embodiment.
Figure 18:
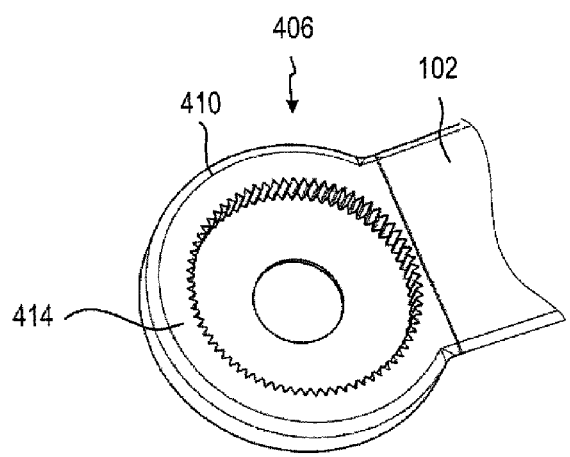
Figure 19:
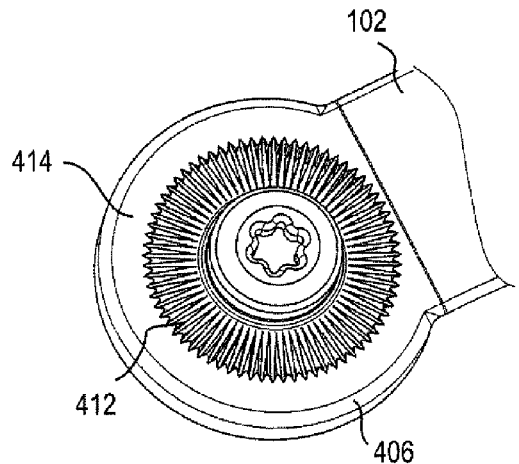

The FIGS. 17 to 19 finally illustrate a fourth embodiment of a locking mechanism for a belt presenter.

As in the just described third embodiment, a second blocking structure 414 is configured at the fastening portion 406 of the arm 102 in the form of a circumferential gearing on a radially inner circumferential wall of a bearing member 410. This is shown in detail in FIG. 18.

FIG. 17 illustrates the first blocking structure 412 provided at the bearing member 409 that is fixedly mounted on the vehicle. It consists of a plurality of radially protruding lamellas that are slightly inherently flexible (in this case they amount to a total of 72) which have little play in the circumferential direction.

FIG. 19 shows the locking mechanism in the assembled state. If the arm 102 is manually rotated, the lamellas of the first blocking structure 412 can slide over the gearing of the second blocking structure 414 and snap from gear to gear. If the action of force on the arm 102 is stopped, the rigidity of the lamellas of the blocking structure 412 is sufficient to retain the arm 102 in the desired locking position.

It is emphasized that the pivoting of the arm 102 and its fastening to the lining ensure that in the case of retention the arm does not position the belt strap. Rather, the pivoted arm can extend so that it does not substantially influence the course of the belt strap and slackens in the case of retention, where appropriate.

The invention claimed is:

1. A belt presenter for a seat belt system comprising a belt strap and at least one deflection fitting (16), comprising
an arm (102) having a belt strap guide (104) and a mounting portion (106-406) by which the arm (102) is adapted to be mounted to a lining member (10),
wherein the arm (102) is manually movable relative to the lining member (10) about an axis of rotation (108) into a plurality of locking positions, a locking mechanism retaining the arm in one of the plurality of locking positions, the locking mechanism having two interacting blocking structures biased against each other, one of the two interacting blocking structures moving relative to the lining member upon manual movement of the arm relative to the lining member, the other of the two interacting blocking structures being fixed to the lining member so that the other of the two interacting blocking structures is prevented from moving relative to the lining member upon manual movement of the arm relative to the lining member.

2. The belt presenter according to claim 1, wherein the arm (102) is rotatable about 360° relative to the lining member in the mounted state.

3. The belt presenter according to claim 1, wherein the biasing is performed by means of a spring (220; 320).

4. The belt presenter according to claim 3, wherein the blocking structures (112, 114; 212, 214; 312, 314) are formed by two meshing gearings, one of the two meshing gearings moving relative to the lining member and the other of the two meshing gearings upon manual movement of the arm relative to the lining member, the other of the two meshing gearings being fixed to the lining member so that the other of the two meshing gearings is prevented from moving relative to the lining member.

5. The belt presenter according to claim 3, wherein the blocking structures (112, 114) are formed on nested bearing members (109, 110) and constitute gearings.

6. The belt presenter according to claim 5, wherein one of the blocking members is a deformable ring that includes a first gearing and the other of the blocking members includes a complementary second gearing configured to engage the first gearing.

7. The belt presenter according to claim 6, wherein a portion of the deformable ring is deflected into a free space disposed on one of the bearing members during manual movement of the arm about the axis of rotation.

8. The belt presenter according to claim 3, wherein one of the blocking structures (114; 214; 312) comprises only an angular area of less than 360°.

9. The belt presenter according to claim 8, wherein the angular area ranges from 5° to 130°.

10. The belt presenter according to claim 3, wherein one of the blocking structures (114; 314; 414) is arranged on the radial inside of a bearing eye of the mounting portion (106; 306; 406) of the arm (102) and the second blocking structure (112; 312; 412) is arranged on a radially outer side of a bearing member (109; 209; 309; 409) located radially inside the bearing eye.

11. The belt presenter according to claim 3, wherein one of the blocking structures (214) is formed on a rear side of the mounting portion (206) of the arm (102) and the second blocking structure (212) is formed at a bearing member (209) facing the rear side of the arm (102).

12. A seat belt system comprising a belt presenter, according to claim 1, wherein the axis of rotation (108) about which the arm (102) can be rotated is arranged, in the vehicle-mounted state, to be offset from a mounting point (18) of the at least one deflection fitting (16) of the seat belt system.

13. The belt presenter according to claim 1, wherein the one of the two blocking structures is coaxial with the other of the two blocking structures.

* * * * *